Figure 1:

Jan. 26, 1954

K. ÖSTERMAN ET AL 2,667,137

APPARATUS FOR WELDING RADIATORS

Filed July 9, 1947

2 Sheets-Sheet 1

INVENTORS
KARL OSTERMAN
GUNNAR ARNBERG
BY *Jarvis C. Marble*
THEIR ATTORNEY

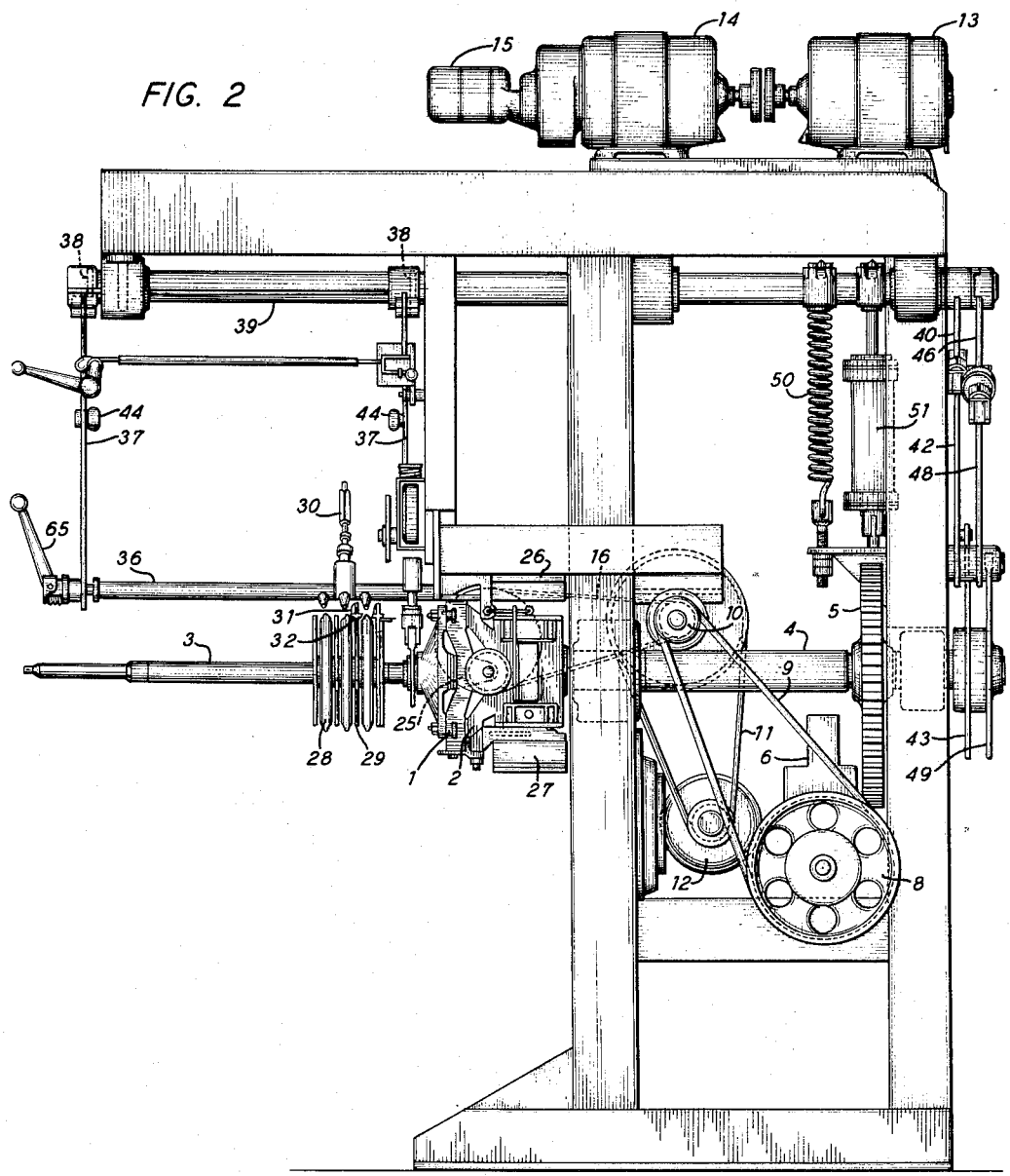

Patented Jan. 26, 1954

2,667,137

UNITED STATES PATENT OFFICE 2,667,137

APPARATUS FOR WELDING RADIATORS

Karl Österman, Stockholm, and Gunnar Arnberg, Lidingo, Sweden, assignors to Svenska Aktiebolaget Gasaccumulator, Stockholm, Sweden, a corporation of Sweden Application July 9, 1947, Serial No. 759,842

2 Claims. (Cl. 113—59)

The present invention relates to an apparatus for the mechanical welding of articles, particularly radiators, the welding joint of which follows a curve in a plane through such joint. The curve form of the joint causes an uneven heat absorption when welding, thus detracting from the quality of the finished weld. In order to avoid this, it has been proposed in accordance with the British Patent No. 433,184 to vary the feeding velocity of the workpiece. Such a velocity variation, however, is not practical, if it involves, as in this case, rather large masses. According to the present invention, the workpiece and/or the welding burner is fed with a substantially constant velocity, whilst the burner not only is raised and lowered in order to be maintained on a predetermined level relative to the part of the welding joint nearest the welding burner, but is also swung in the plane of the joint and is maintained at a substantially constant angle with respect to the welding joint.

The arrangement according to the invention will be further explained in connection with the description of a radiator welding machine shown in the accompanying drawings. Fig. 1 shows a front elevational view of the machine. Fig. 2 shows a side elevational view of the machine.

A carrier 1 is movable along a guide 2 and includes a pair of horizontal supporting arms 3, adapted to support radiator sections. The carrier 1 is provided with a sliding shoe in each corner. The sliding shoes on one of the long sides of the guide are arranged variably to slide respectively on fixed slidings 63, 64. Substantially midway of its length the guide 2 is fixed on a shaft 4, provided with a cog wheel 5, this shaft being driven through a worm gear 6, a slip coupling 7 with belt wheel 8, a belt 9, an intermediate shaft 10 and belt 11 by an electric motor 12. This motor obtains its current from an electric generator 13, connected with an electric driving motor 14 and a magnetizing machine 15.

The intermediate shaft 10 drives by means of a V-belt 16 a shaft 17, which is provided with a pinion gear 18, this gear being kept in such a position under the influence of springs 19 that the pinion gear 18 is in mesh with a cog wheel 20, which is situated on one end of a screw spindle 21, positioned in the guide 2 and lying in the longitudinal direction of the guide and being provided in its other end with a cog wheel 22 similar to the cog wheel 20. At each cog wheel 20 and 22 steering plates 23 and 24 respectively, are fixed on the guide 2 and arranged to move the pinion gear 18 against the action of the springs 19 in certain cases, further described hereinafter. A nut 25 fixed on the carrier 1 is continuously in threaded engagement with the screw spindle 21. Counterbalance weights 26, 27 movable along the guide 2 are connected with the carrier 1 by means of chains, these weights moving in opposite direction to the movement direction of the carrier along the guide 2.

On the supporting arms 3 fifteen radiator sections 28 may be arranged, only three of these however, being shown in Fig. 2. Each radiator section is formed by two punched and pressed half plates. Between the radiator sections 28 spacing or cam plates 29 are provided, the edge outline of which extends parallel with but a little inside the edge outline of the sections. Above each section 28 a welding burner 30 is disposed, of which only one is shown in Fig. 2. The welding burners are provided at their nozzle ends with a finger 31 engageable with the side of a section 28 and having a sliding shoe 32 for engaging one of the cam plates 29. The burner 30 is connected at 33 by means of a link 34 with a holder 35 on a shaft 36 in such a manner that the burner is movable vertically and laterally swingable in order to maintain contact of the finger 31 against the edge of the section 28 and engagement of the sliding shoe 32 with cam plate 29. Contact of the finger 31 against the edge of the section 28 is obtained by means of a lever 65. The shaft 36 is supported by a pair of frames 37, which are swingably suspended from arms 38 fixed on a shaft 39. On this shaft 39 an arm 40 is fixed, which by means of a rod 41, adjustable as to length, is connected with one arm of a bell crank lever 42, the other arm of which rests on a cam plate 43 fixed to the shaft 4. The frames 37 are further connected by a pair of links 44, to a pair of pivotally mounted arms 46. An adjustable rod 47 is connected to one arm of a bell crank lever 48 the other arm of which rests on a cam plate 49 fixed on the shaft 4.

A strong spring 50 is so connected to the shaft 39 that the spring power nearly counterbalances the weight of the frames and a part of the mechanism connected therewith. Moreover, there is a means 51 connected with the shaft 39 and operated by compressed air, this means being arranged so as to turn the shaft 39 and move the frames 37 with the welding burners suspended thereon in and out of operative position. Further, suitable circuit-connectors and -breakers not shown may be so arranged, that they are actuated by the frames 37 or some part connected therewith, when the frames move the welding burners in or out of operative position.

The machine works in the following way. It is assumed that section halves 28 intended to be welded are secured on the supporting arms 3 and that gas is led to the welding burners, which are situated above the section halves, whereafter the burners are lighted. The means 51 is thereafter emptied of compressed air so that this allows the frames 37 and through these the welding burners 30 to lower themselves against the section halves. During said lowering the frames 37 influence a not shown circuit connector so that the electric motor 12 is put into action and drives the screw spindle 21 through the transmission elements 11, 10, 16, 17, 18, 20, as a consequence of which the carrier 1 with the section halves moves to the left as viewed in Fig. 1. When the frames 37 are in their lowest position, that is to say when the bell crank levers 42, 48 respectively rest on the cam plates 43 and 49, the fingers 31 are moved against the side of the radiator sections by means of the lever 65 and thereafter one long side of the section halves is welded together. During this operation the motor 12 exerts a turning force on the shaft 4 but due to engagement of the sliding shoes 61, 62 with the slidings 63, 64 rotation of the carrier 1 and the guide which are fixed on the shaft 4 is prevented, as a consequence of which the coupling 7 slips. A certain torque, however, is continuously applied tending to turn the shaft 4 anti-clockwise as viewed in Fig. 1.

When the carrier 1 with the radiator sections 28 has moved past the stationary welding burners 30 to the point where the rounded end part of the sections have arrived at or in the neighbourhood of the burners, the sliding shoes 61, 62 have arrived at the end of the slidings 63, 64 and no longer prevent turning of carrier and guide. The shaft 4 consequently begins to turn, whereby the cam plates 43 and 49 move the frames 37 through the cam followers and connecting linkages. The arms 38 connected to the frames 37 operate to raise and lower the frames, while the links 44 operate to swing the frames to and fro. Consequently, the arms 38 and the links 44 operate to move the frames in two perpendicular directions, that is to say, substantially perpendicularly to and along the joint. Through this mechanism it is possible to let the shaft 36 with the holders 35 describe such a movement that the welding burners as they are raised or lowered by engagement of the shoes 32 with the plates 29, are lowered or raised within a certain angular range in the plane of the welding joint so that the longitudinal directions of the burners are maintained at a substantially constant angle with the welding joint adjacent the welding burners. The feeding of the end edges of the radiator sections by the burners is obtained by rotation of the shaft 4 through the slip coupling 7 whereby the left end of the guide 2 and the sections in Fig. 1 are rotated downwards, the gears 18, 20 go out of mesh and the rotation of the screw spindle 21 ceases. During the continued rotation of the guide the steering plate 24 goes against the fastening of pinion wheel 18 and presses it to the left against the action of the springs 19, while cog wheel 22 passes and thereafter goes into mesh with the pinion gear 18 so that rotation of screw spindle 21 and movement of guide 2 starts and the welding of the other long side of the radiator sections takes place. After this there follows another half turn of the guide 2 during which the other end edges of the sections are welded. When the sections are all welded the welding is stopped by application of compressed air to the means 51. The frames 37 and the welding burners 30 are consequently raised from the section halves, whereby the frames 37 influence a not shown circuit-breaker which stops the motor and the gas supply. By changing the length of the rods 41, 47 it is possible to change the angle of the burners with respect to the longitudinal direction of the welding joint.

It should be clear that the machine, especially as to details, may have different constructions within the scope of the invention.

Subject matter herein disclosed and not claimed constitutes the claimed subject matter of our copending application Serial No. 394,444, filed November 25, 1953.

What we claim is:

1. Apparatus for welding together the edges of juxtaposed work-pieces presenting a joint to be welded which includes a curved line in the plane of the weld, said apparatus comprising a base, a shaft rotatably mounted on said base, a carriage fixed to said shaft and rotatable therewith, means on said carriage for securing non-cylindrical work pieces thereto, means on said base to rotate said shaft at a uniform rate, two cams fixed to said shaft for rotation therewith, a welding burner having a nozzle, a frame movably supporting said burner on said base, a cam follower engaging one of said cams, linkage means connecting said follower and said frame whereby upon rotation of said cam said frame will move in a substantially vertical direction, a second cam follower engaging the other of said cams, linkage means connecting said second follower and said frame whereby upon rotation of said other cam said frame will move in a substantially longitudinal direction and means comprising a cam plate fixed with respect to said work-piece and movable therewith and a shoe carried by said nozzle and engaging said cam plate during travel of said work-piece relative to said nozzle for maintaining said nozzle a predetermined distance from an adjacent portion of the joint during the welding operation.

2. Apparatus as defined in claim 1 in which both of said linkage means include adjustable connections for facilitating initial adjustment of the apparatus.

KARL ÖSTERMAN.
GUNNAR ARNBERG.

References Cited in the file of this patent

UNITED STATES PATENTS

| Number | Name | Date |
| --- | --- | --- |
| 1,238,257 | Butler | Aug. 28, 1917 |
| 1,730,064 | Eskilson | Oct. 1, 1929 |
| 1,940,331 | Smith | Dec. 19, 1933 |
| 2,091,307 | Catlett | Aug. 31, 1937 |
| 2,288,032 | Smith | June 30, 1942 |
| 2,469,815 | Cutright | May 10, 1949 |